Dec. 29, 1970     S. PARISER     3,550,409
ANTITHEFT DEVICE FOR AUTOMOBILES AND THE LIKE
Filed Sept. 26, 1968
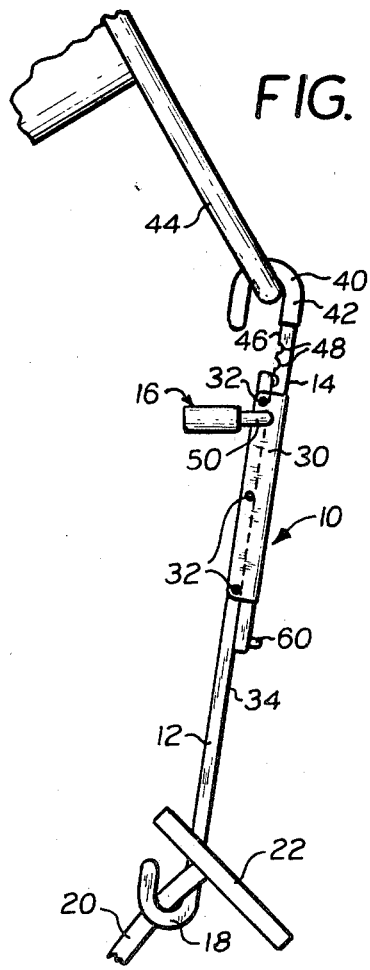
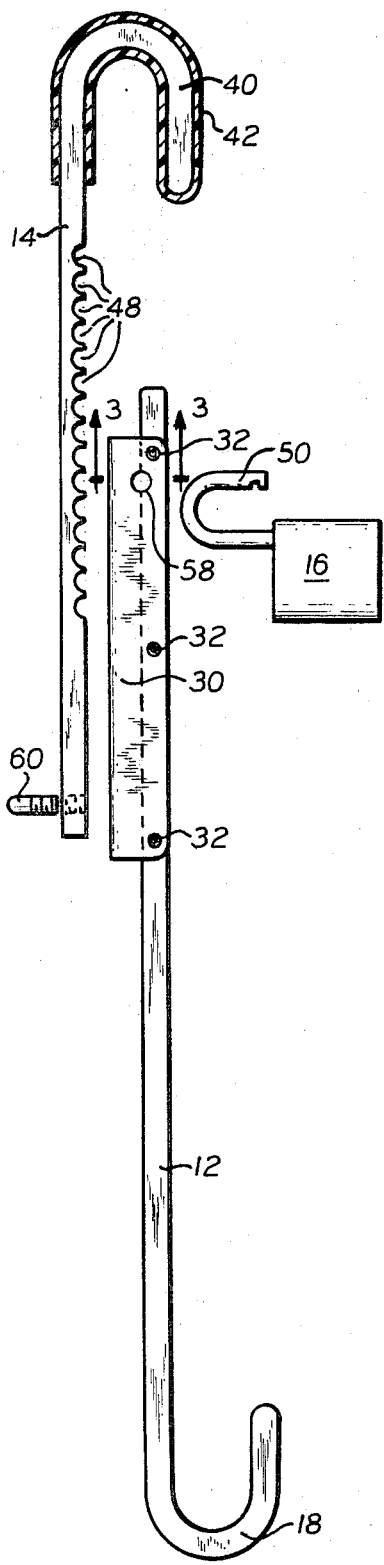
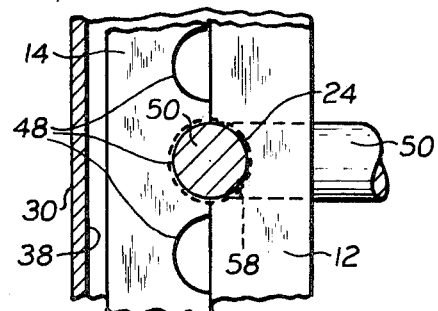
INVENTOR
SIDNEY PARISER
BY
*Hubbell Cohen & Stiefel*
ATTORNEYS.

United States Patent Office 3,550,409
Patented Dec. 29, 1970

3,550,409
ANTITHEFT DEVICE FOR AUTOMOBILES AND THE LIKE
Sidney Pariser, Mount Vernon, N.Y., assignor to RMS Electronics, Inc., Bronx, N.Y., a corporation of New York
Filed Sept. 26, 1968, Ser. No. 762,759
Int. Cl. B60r 25/00; E05b 65/12
U.S. Cl. 70—203                              2 Claims

ABSTRACT OF THE DISCLOSURE

An antitheft device for automobiles having a steering wheel and a pedal diposed on the floor, comprising two elongated hooked members which are connected to one another for relative longitudinal movement. Each of the members is provided with cutouts which when registered form a passage for receiving the hasp of a padlock to prevent further relative movement.

BACKGROUND OF THE INVENTION

Field of the invention

The present invention relates to a device for preventing the theft of an automobile or the like.

Description of the prior art

Antitheft devices for automobiles utilizing an elongated member secured to both the steering wheel and a floor pedal are known. However, these devices generally require telescoping parts and complicated and costly lock assemblies integrated therein. In one known prior art patent, a complex and costly locking arrangement for securing the antitheft device to the steering wheel of the automobile is included. In another, a separate locking member is required to secure the device to the steering wheel.

SUMMARY

The present invention comprises two elongated steel bars, each having a hooked end. One of the bars is provided with a U-shaped strap and the strap, together with a longitudinally extending surface of the bar extending thereacross, defines a passage for slidably receiving the other of the bars. The bar to which the strap is secured is provided with a semi-cylindrical cutout that is adapted to register with one of a number of semi-cylindrical cutouts of the other of the bars. In register, the cutouts define a cylindrical passage for receiving the hasp of a padlock or the like, whereby to prevent further relative movement of the two elongated hooked bars.

In use the upper hooked end is hooked over the steering wheel and the lower hooked end is hooked around a floor pedal such as the gasoline or brake pedal. The members are then moved relative to one another until their movement is further prevented by the inter-engagement with the steering wheel and the pedal. Thereafter the two members are adjusted until one of the cutouts on one of the members registers with the cutout on the other of the elongated members to thereby define a hasp receiving passage for a padlock. The padlock is then inserted through the passage and is locked whereby to prevent operation of the automobile's steering wheel, and the floor pedal and thus effectively prevent operation of the automobile itself.

BRIEF DESCRIPTION OF THE DRAWINGS

FIG. 1 is an elevational view of an antitheft device of the present invention secured to a floor pedal and to the steering wheel of an automobile to prevent theft thereof;

FIG. 2 is an exploded plan view of the antitheft device of FIG. 1;

FIG. 3 is a sectional view taken along the line 3—3 of FIG. 2; and

FIG. 4 is a fragmentary view partly in section and partly in elevation illustrating the means for locking the antitheft device of the present invention.

DESCRIPTION OF THE PREFERRED EMBODMENT

Referring now to the drawing in detail, the antitheft device of the present invention is generally designated by the reference numeral 10. The device includes a lower elongated member 12 and an upper elongated member 14 which at times are prevented from relative movement by a padlock 16.

Specifically, the lower member 12 is provided with a hooked end 18 adapted to fit around the rod 20 of a floor pedal 22 such as, for example, a brake pedal, a clutch pedal, or gas pedal. Near the upper end of elongated member 12 is a cutout 24, shown in its preferred semi-cylindrical form in FIGS. 3 and 4, although other shapes may be employed. Fixed to the two sides 26 and 28 of lower elongated member 12 are the legs or sides of an elongated U-shaped strap 30, the manner of securement to member 12 being any suitable manner such as, for example, by welding, nuts and bolts, and as shown herein, rivets 32. The confronting surface 34 of member 12 together with the interior surface 36 of the bight of U-shaped strap 30 define a passage 38 for slidably receiving the upper elongated member 14 therein.

Upper elongated member 14 is provided with an upper hooked end 40 which is preferably covered by a sleeve 42 for protecting the steering wheel 44 on to which the hooked end 40 is hooked. The sleeve may be made of a soft protective plastic such as vinyl or polyethylene, or it may be made of rubber or similar protective material. Provided on the surface 46 of upper member 14, which surface 46 confronts the surface 34 of lower elongated member 12, are a plurality of cutouts 48 shown, and preferred as semi-cylindrical although other forms, preferably the same as cutout 24, may be employed. By relatively moving elongated members 12 and 14 longitudinally of each other, cutouts 48 can selectively be brought into register with the cutout 24 in lower member 12 to define therewith a cylindrical passage for reception of the hasp 50 of the lock 16. In order to gain access to the passage defined by the two semi-cylindrical cutouts 24 and 48, the sides 52 and 54 of U-shaped member 30 are provided with registered apertures 56 and 58, respectively, which apertures are positioned to register with the passage defined by the registered cutouts 24 and 48.

To prevent inadvertent detachment of upper member 14 from lower member 12, a stop 60 is secured to the lower end of upper member 14 as by welding, riveting or, as shown, by screwing, which stop 60 will engage the lower end of elongated U-shaped member 30 and prevent further upward movement of the upper member 14 relative to lower member 12.

The antitheft device 10 may be constructed by taking two elongated rectangular or square bars 12 and 14 and bending their ends to form the hooks 18 and 40. Preferably, bars 12 and 14 have been hardened, and preferably case hardened, to render them more resistant to sawing or the like. Members 12 and 14 can be so hardened either before or after they have been fabricated into their final shape. The surface 34 of lower member 12 may then be provided, as by milling, punching or the like, with semi-cylindrical cutout 24 and a similar manufacturing step may be employed to provide surface 46 of upper member 14 with a plurality of semi-cylindrical cutouts 48. Of course, upper member 14 could be provided with a simple cutout 48 and lower member 12 with a plurality of cutouts 24 without departing from the invention. The U-shaped strap 30 is thereafter affixed to lower member 12 in the described and illustrated position as by rivets 32 and then is punched to provide apertures 56 and 58 to register with the semi-cylindrical cutouts. (Of course U-shaped member 30 could be secured to upper member 14 rather than lower member 12.) Upper member 14 is then slid through passage 38 and stop 60 is secured thereto as by screwing, riveting, welding or the like. Finally, sleeve 42 is slid over the hooked end 40 of upper member 14 for protection of the steering wheel 44.

In use the user will generally hook the lower end 18 around the pedal rod 20 of the brake or gas pedal 22 of an automobile. He will then extend the member 10 by sliding the upper member 14 upwardly relative to the lower member 12 until the hooked end 40 of the upper member 14 clears the lower part of the steering wheel 44. Thereafter, he will move the upper member 14 downwardly until further movement is prevented by the steering wheel 44 itself. In the last described position, the user will determine whether the cutouts 24 and 48 on lower member 12 and upper member 14, respectively, are in register, as by viewing through one of the apertures 56 or 58 in the U-shaped strap 30. If they are not in register he will adjust the relative positions between the elongated members 12 and 14 slightly to bring them into register without permitting a disconnection or unhooking of the ends 18 and 40 from their respective stationary parts, namely the pedal shaft 20 and steering wheel 44. When the semi-cylindrical cutouts 24 and 48 are in register, the user will take open padlock 16 and pass the hasp 50 thereof through the apertures 56 and 58 and the passage defined by the registered semi-cylindrical cutouts 24 and 48, and close the lock, whereby preventing any further relative movement between the lower member 12 and the upper member 14.

In the event that a thief should endeavor to steal the automobile, the antitheft device will prevent both the manipulation of the pedal 22 and the steering wheel 44 thereby effectively preventing the use of the automobile. In this way the device effectively prevents the theft thereof.

It will be obvious to anyone skilled in the art that in lieu of the presently preferred semi-cylindrical and registrable cutouts 24 and 48, members 14 and 12 could be provided with apertures which may be brought into register to provide a passage for the hasp 50 of the lock 16. However, such an arrangement, although usable, is generally more costly in manufacture than is the described embodiment.

While I have herein shown and described the preferred form of the present invention and have suggested modifications therein other changes and modifications may be made therein without departing from the spirit and scope of this invention.

What is claimed is:
1. A vehicular antitheft device comprising,
  first and second elongated members of rectangular cross-section and each having a hooked end,
  a U-shaped member having its two legs secured to appropriate sides of said first elongated member and the bight thereof spaced from a third side to define a channel therewith,
  the second of said elongated members being slidably disposed in said channel with one of its surfaces in confronting relation with said third surface of said first elongated member, said confronting surface of said second elongated member having a plurality of notches and said third surface of said first elongated member having a notch registrable with said notches of said second member to define a hasp receiving passage,
  the legs of said U-shaped member each having an aperture in register with said hasp receiving passage, whereby to permit the passage of the hasp of a lock therethrough for preventing relative slidable movement between said first and second elongated members.
2. The antitheft device of claim 1, further comprising a padlock including a hasp disposed within said hasp receiving passage and said apertures in the sides of said U-shaped member.

References Cited

UNITED STATES PATENTS

| | | | |
|---|---|---|---|
| 2,556,900 | 6/1951 | Buschhorn | 70—230 |
| 2,716,336 | 8/1955 | Ross | 70—238 |
| 3,190,090 | 6/1965 | Zaidener | 70—203 |
| 3,245,239 | 4/1966 | Zaidener | 70—202 |

MARVIN A. CHAMPION, Primary Examiner

R. L. WOLFE, Assistant Examiner

U.S. Cl. X.R.

70—212, 238